United States Patent [19]

Chen et al.

[11] 4,090,249

[45] May 16, 1978

[54] APPARATUS FOR SORTING RECORDS IN OVERLAP RELATION WITH RECORD LOADING AND EXTRACTION

[75] Inventors: Tien Chi Chen, San Jose; Chin Tung, Saratoga; Vincent Y. Lum, Monte Sereno, all of Calif.

[73] Assignee: International Business Machines Corporation, Armonk, N.Y.

[21] Appl. No.: 745,255

[22] Filed: Nov. 26, 1976

[51] Int. Cl. .......................... G06F 7/22; G11C 19/00
[52] U.S. Cl. .................................................. 364/900
[58] Field of Search .............................. 364/200, 900

[56] References Cited

U.S. PATENT DOCUMENTS

| | | | |
|---|---|---|---|
| 3,533,074 | 10/1970 | Webb | 340/172.5 |
| 3,587,057 | 6/1971 | Armstrong | 340/172.5 |

*Primary Examiner*—Gareth D. Shaw
*Assistant Examiner*—C. T. Bartz

*Attorney, Agent, or Firm*—R. Bruce Brodie

[57] ABSTRACT

This invention describes a pipeline sorter, in which record-pairs are compared and conditionally swapped while being advanced along the pipeline synchronously. The pipeline sorter has the topology of a U-shaped tube, with regularly spaced crosspaths linking the two arms. Records are loaded one at a time, into the input arm synchronously, and emerge out of the output arm, also one at a time and synchronously. Within the sorter, at periodic time intervals a number of record-pairs at correlated positions of the U-tube are compared. Dependent on the comparison outcome, either the original records themselves, moving along vertical paths, or their permutation, moving along crosspaths, will arrive at the next down-stream positions. In this manner, as soon as the last record has been loaded, the correctly sorted output will begin to emerge, with the overall sorting time completely overlapped by the loading and unloading of records.

9 Claims, 8 Drawing Figures

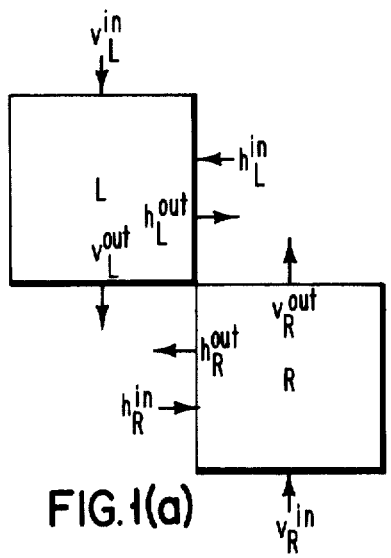
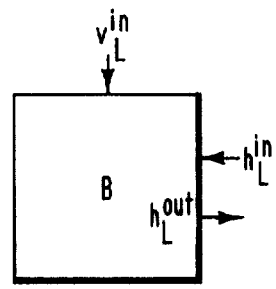
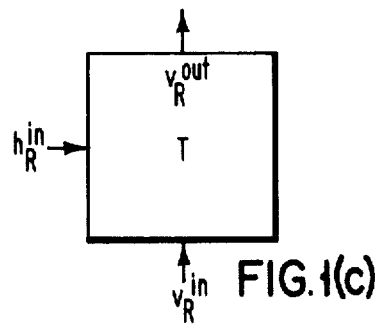
FIG. 1(a)
FIG. 1(b)
FIG. 1(c)
FIG. 1 – THE BUILDING BLOCKS
1(a)- THE STEERING UNIT
1(b)- THE BOTTOM CELL AS DEGENERATE LEFT CELL OF STEERING UNIT
1(c)- THE TOP CELL AS DEGENERATE RIGHT CELL OF STEERING UNIT
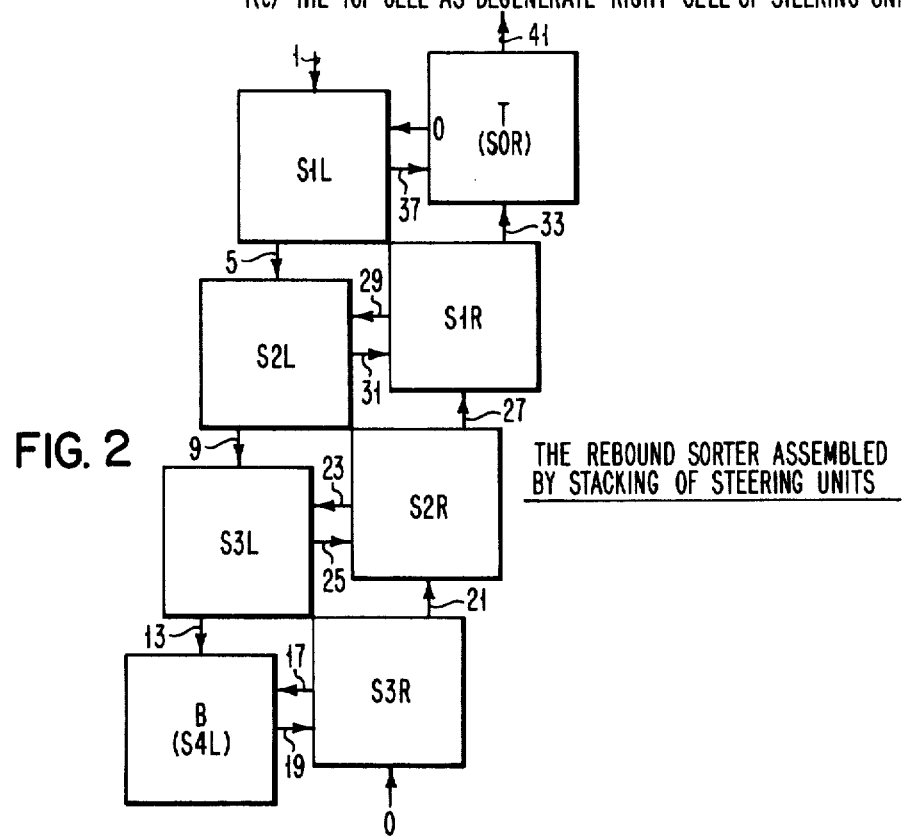
FIG. 2
THE REBOUND SORTER ASSEMBLED BY STACKING OF STEERING UNITS

DYNAMIC SEQUENCING IN A 4-RECORD SORTER (TIME IN CYCLES)

A TYPICAL RECORD FORMAT. THE LENGTH NORMALLY SHOULD NOT EXCEED THAT OF THE REGISTERS IN STEERING UNITS.

APPARATUS FOR SORTING RECORDS IN OVERLAP RELATION WITH RECORD LOADING AND EXTRACTION

SUMMARY OF THE INVENTION

It is an object of this invention to describe an apparatus for sorting plural bit records, the sorting time being in overlap relation with record loading and unloading.

The apparatus of the invention can be visualized as a U-shaped pipeline processing path with normal data flow down the left arm along the U and up the right arm. Crosspaths between the two arms are provided to facilitate data exchange. The input records with their identifiers are loaded sequentially down the left arm, and records after processing emerge from the top of the right arm. The identifiers in the valid records, which are moving up along the right arm, are selectively compared with those in the valid records moving down the left arm. Either the original records or their permulation will, in one time cycle, arrive at the next downstream positions along the U-tube. Normal flow without exchange occurs if the comparisons involve invalid records, and output is suppressed if both records are invalid. The operations using this structure advantageously overlaps the sorting time with synchronized loading and unloading.

The pipeline processing path is formed from a plurality of logical building blocks, called steering units. Each steering unit has the topology of a slanted "figure 8" with an upper left cell and a lower right cell. The steering units are stacked together. The stacked left cells form a left arm to support downward data flow, while the stacked right cells form the right arm to support upward data flow. The linkage between the two arms, as well as the final exit from U-shaped apparatus, each make use of buffer cells which could be considered to be partly disabled steering units.

Reference is made to U.S. Letters Pat. No. 3,997,880 to T. C. Chen, et. al., U.S. Ser. No. 556,377, filed Mar. 7, 1975, entitled "An Apparatus and Machine Implementable Method for the Dynamic Rearrangement of Plural Bit Equal Length Records", and to U.S. Letters Pat. No. 4,078,260, co-pending application to T. C. Chen, et. al., U.S. Ser. No. 685,859 filed on May 12, 1976 entitled "An Apparatus for Transposition Sorting of Equal Lengths Records in Overlap Relation with Record Loading and Extraction".

The Ser. No. 685,859 application is directed to minimizing the total time of serially loading, sorting, and unloading records into and from uniform ladder structures of the type described in U.S. Pat. No. 3,997,880. Each uniform ladder structure in said references is formed from equal length loops fillable with equal length records. The loops are coupled into a linear array by dual mode switches implementable in magnetic bubble technology. The apparatus described in the Ser. No. 685,859 application minimizes processing time by over-lapping the sorting of records with the serial loading and unloading process via the critical use of multiple uniform ladders of unequal length. This permits sorting in a number of filled long ladders while the remaining shorter ladders are being loaded or are awaiting loading. The process of overlapping the sorting of the contents of the longer ladders with the loading of the shorter ladders results in all of the ladders having their contents sorted by the time the shortest ladder is filled. The partially sorted results are then merged with each other in a separate pass, as the ladders are unloaded.

Advantageously, the pipeline sorter of the instant invention, also denominated, "rebound sorter", is not limited to magnetic bubble or shift-register technology, and need not be serial. It requires only a single processing path combined with logic to exchange and advance records at preselected points along the path. This is accomplished by topologically folding over a linear path into a U-shape and providing sensing/comparison and exchange mechanisms between the contents at preselected correlated points in the two arms of the U. For the sorting of N records, the apparatus requires 2N cells. Of these 2N-2 cells are arranged into (N−1) steering units with the addition of one buffer cell coupling the upward/downward arms and one other buffer cell serving as an output buffer. On the basis that two time cycles are used to load each record into the apparatus, it has been found that starting at time $t_o$, the first comparison starts at time $t_o+(N+1)$ cycles the first sorted record emerges at $t_o+(2N+1)$ cycles, the last comparison occurs at $t_o+(3N-3)$ cycles, and the last sorted record exits from the apparatus at time $t_o+(4N-1)$ cycles.

The advantages of the rebound sorter over the Ser. No. 685,859 invention are:
1. It is implementable in a variety of data processing technologies.
2. It can be either word-parallel or serial by any data width.
3. It uses only one pipeline data path. There is no need for merging the results as in Ser. No. 685,859.
4. In Ser. No. 685,859 each ladder is almost fully loaded before any comparison can begin. Here comparison begins as soon as more than half of the records have entered the U-tube.

DESCRIPTION OF THE DRAWING

FIG. 1 shows the building blocks and their external linkage.

FIG. 2 sets forth a rebound sorter formed from unit cells.

DESCRIPTION OF THE PREFERRED EMBODIMENT

Figure 5:
FIG. 5 sets forth a typical format for plural bit records of the type suitable for use in the invention.

Referring now to FIG. 5, there is shown the format for each record, where the identifier may begin at any bit position, and may consist of up to the entire record. Each of the records inside the apparatus is accompanied by a validity indicator. The monitoring for validity and comparison of identifiers are needed to decide on the swapping or sorting of records.

We shall now describe a preferred embodiment. N records in general can be sorted using (N−1) steering units plus two buffer cells. For convenience, we shall limit N to 4. The generalization to other values of N is straightforward. We shall also limit the records to sizes no larger than a cell register can contain; these records nevertheless need not be fixed in size, as each can be padded with extra zero bits to fit the register.

Referring now to FIG. 1, there is shown in drawings A, B, and C the constituents of the rebound sorter. In FIG. 1A, the primary logical element, termed a "steering unit" has the appearance of slanted "figure 8" with an upper left cell L and a lower right cell R. Each steering unit cell has a register to hold one record, and possesses vertical and horizontal input/output ports.

During operation, only two of the four output lines for a steering unit may be activated, either the two horizontal lines ($h_L^{out}$, $h_R^{out}$) or the two vertical lines ($v_L^{out}$, $v_R^{out}$). The criterion for selective activation of the lines is based on a comparison rule of action between the identifier associated with the valid record in the left cell, versus the identifier for the valid record in the right cell. Assuming it is intended to sort records in ascending order, the record having the smaller identifier would emerge at $h_L^{out}$ or $V_R^{out}$, while the record having the higher identifier would emerge at $v_L^{out}$ or $h_R^{out}$. The presence of invalid records call for special handling. This is formulated in the following rule for ascending order sorting.

If $C(L) \geq C(R)$, or if invalid record is present, activate vertical output lines (normal flow);

Else: activate horizontal output lines (abnormal flow). Descending order sorting obtains by replacing the $\geq$ sign by the $\leq$ sign.

The bottom cell (FIG. 1B) and the top cell (FIG. 1C) are truncated and simplified versions of a L and R cell respectively of a steering unit. They serve no comparison function, providing only mandatory output with delay consequent to input from one of the two input lines.

The rebound sorter is assembled with stacked steering units plus the two buffer cells, as shown in FIG. 2. The left cells are stacked through the alignment of their vertical ports to form a left arm to support downward data flow, while the right cells are also stacked with their vertical ports aligned to form a right arm to support upward data flow. The upward and downward data motion will be considered normal. The horizontal ports are correspondingly aligned to enable crosspath flow between the two arms. The stacked steering units are complemented at the lower left by a bottom unit, and at the upper right by a top unit, with vertical and horizontal ports properly aligned.

In FIG. 2, the assemblage forms a rebound sorter for four records. The left arm of the U-shaped path is formed by input 1, steering units cells S1L, S2L, S3L, bottom cell B (which can be considered to be S4L) and connecting paths 5, 9, and 13. The right arm is formed by steering units cells S3R, S2R, S1R, top cell T, (which can be considered to be S0R) and connecting paths 21, 27, and 33. Bottom unit B operates as a pivot coupling the left and right arms. By identifying $h_R^{out}$ of an upper steering unit with $h_L^{in}$ of the steering unit immediately below, also by identifying $h_L^{out}$ of a steering unit with $h_R^{in}$ of the steering unit immediately above, crosspaths are provided to link the two arms at regular intervals. These crosspaths are: paths 17, 19, which link bottom unit B with steering unit cell S3R; paths 23 and 25 link steering units cells S3L with S2R; paths 29 and 31 which link steering unit cells S2L with S1B, and finally S1L is linked to the top cell T via path 37. The horizontal input line to S1L is disabled, likewise the vertical input line to S3R. These disabled lines can be considered to have fixed zero input, as shown in FIG. 2.

Significantly, in this logical arrangement every unit is pulsed simultaneously and periodically with uniform lapsed time cycles. Each of the steering units may receive a pair of valid records, compares them and emits them through either horizontal or vertical paths in one time cycle. The steering units with no valid record in either of the cells have no valid output and can be given normal vertical output. Those units with exactly one invalid record have normal vertical output. The top unit T receives its input from the topmost steering unit cell S1R into its one record buffer, then transmits the record upward out of the system in one cycle. Likewise, the bottom unit B receives its input from the lowest steering unit S3L and sends the record horizontally to steering unit S3R over path 19 in one cycle. All input records are provided with a validity indicator, which needs only to take one bit. All data transmission internal to the rebound sorter are performed with the accompaniment of the validity indicator. Upon exit, this indicator may be stripped off the valid records.

The entire system is capable of accepting one record in two cycles, and eject one record in two cycles. Any steering unit will be idle at alternate cycles; but during a working cycle, will receive a pair of inputs, compare and emit them all in one cycle.

Figure 3:
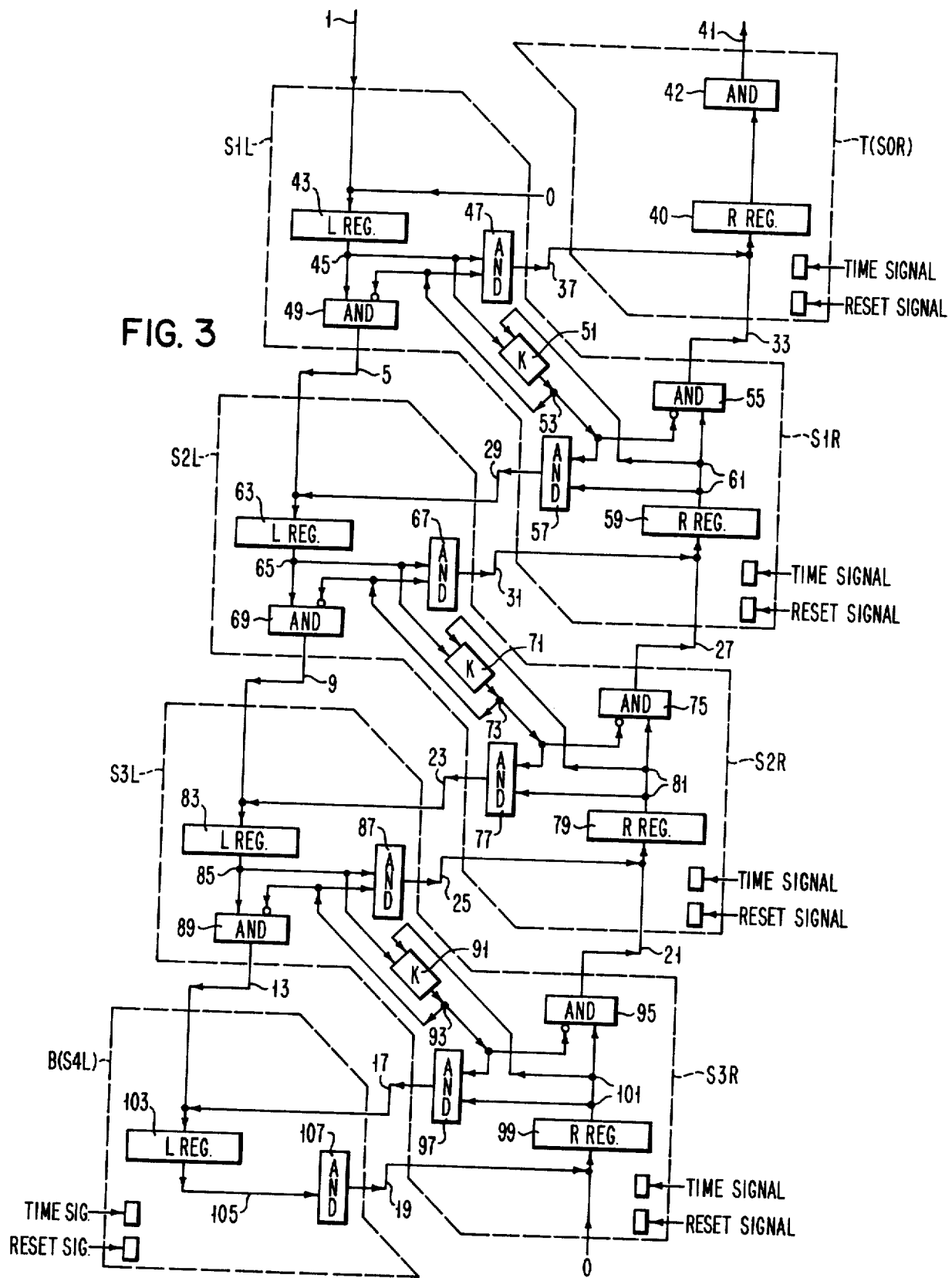
FIG. 3 illustrates the logical implementation of the rebound sorter of FIG. 2.

FIG. 3 is a logic level implementation of the 4-record rebound sorter of FIG. 2. Each of the steering units (S1L,R), (S2L,R), and (S3L,R) includes two storage registers, one in each cell. Each register is capable of holding one record and providing validity indication. Each of the steering units further include circuitry for checking validity, comparing record identifiers, and a gating arrangement for sending the records stored in the L,R cells along either the vertical output paths or the horizontal output paths. The logical circuits can be implemented using standard flip-flops, AND, OR, EXCLUSIVE OR gates. These circuits are of well known and standard design and are not in themselves the object of this invention. Reference can be made by one having skill in the art to a number of standard works as for example: R. K. Richards, "Digital Design" Wiley-Interscience, New York 1971, p. 461–462.

Referring again to FIG. 3, records to be sorted enter sequentially via path 1 to steering unit cell S1L where they are loaded into register 43 and are provided with validity indicators. At the same time that register 43 is loaded with a new record, register 59 in S1R is loaded with a record and its validity indicator, transferred from register 79 through AND gate 75 and path 27 or from register 63 through AND gate 67 and path 31. Both the identifiers and indicators from registers 43 and 59 are sent to comparator 51 over paths 45 and 61 respectively. A signal indicative of the results of, for exmple, a relative magnitude comparison between the identifiers is transmitted via paths 53 to the AND gate cluster 47, 49, 55, and 57 for selective output. A binary 0 transmitted through path 53, for example, will lead to 0 output from AND gates 47 and 57, blocking the horizontal crosspaths, while enabling AND gates 49 and 55 to transmit contents of 43 and 59 respectively, at the proper time signal, along the normal vertical flow direction. Conversely, a comparison result of 1 on path 53 will disallow AND gates 49, 55 to transmit along the normal vertical direction, while enabling AND gates 47 and 57 to transmit contents of 43 and 59 respectively along the crosspaths in "abnormal" delivery.

The detailed transfer paths are as follows:

For 0 result in path 53 (normal delivery): Upon proper time signal, the record stored in register 43 in steering unit cell S1L is transmitted vertically via path 45, AND gate 49, and path 5 to register 63 in unit cell S2L. The record stored in register 59 steering unit cell S1R is transmitted vertically via path 61, AND gate 55 and path 33 to register 40 in top unit T. The crosspaths 29, 39 deliver 0's without affecting the register contents of registers 63 and 40.

For 1 result in path 53 (abnormal delivery): Upon proper time signal, the record stored in register 43 in S1L is transmitted horizontally via path 45, and gate 47, path 57 to register 40 in top unit T. The record stored in register 59 in S1R is transmitted horizontally via path 61, AND gate 57, path 29 to register 63 steering unit cell S2L. The vertical paths 5, 33 deliver 0's with no effect on registers 63 and 40.

The above is generalizable to all steering units for an N-record sorter, B is called SNL, and T is called SOR below for convenience.

If steering unit Sj issues a comparison result of 0 (normal delivery) the horizontal output paths will be blocked, and vertical paths will be enabled upon proper time signal to deliver contents of SjL to S(j+1)L contents of SjR to S(j-1)R.

If steering unit Sj issues a comparison result of 1 (abnormal delivery) the vertical output paths will be blocked, but horizontal crosspaths will be enabled upon proper time signal to deliver contents of SjL to (S(J-1)R, contents, of SjR to S(J+1)L. The operation of the top and bottom unit differs only in a minor regard from that of the steering units. The output of B is always along a crosspath (in FIG. 3, path 105, AND gate 107, path 19 to register 99 in steering unit cell S3R). The output of T is always along a normal path (AND gate 42, path 41). There is no active crosspath to deliver T contents norizontally to S1L; for symmetry the horizontal input to S1L is marked with 0 input. Likewise, there is no valid active vertical input to S3R; the line is marked with 0 input.

A discussion of timing is in order here. At time $t_o$, deliveries of the input records begin, in such a way that the first record reaches S1L in $t_o + 1$ cycles, the K-th record in $t_o + 2K + 1$ cycles. All odd-labelled units S1, S3, ...,S(2J−1), ... (S(N−1) or SN) must be serviced during the "odd" cycle starting at $t_o+2k+1$, namely within $[t_{o+}2k+1, t_{o+}2k+2]$. Likewise, all even-labelled units S0, S2, ..., S (2j), ... (S(N−1) or SN) must be serviced during the "even" cycle starting at $t_o+2k+2$, namely within $[t_o+2k +2, t_o+2k+3]$. And the service of a steering unit consists of:

first, select identifiers and validity indicators, compare and issue compare result (0 or 1)
next, based on the compare result, activate AND gates controlling either the horizontal or the vertical passage to allow movement of contents into a neighboring cell.

During odd cycles, the even-labelled units could be serviced, but must not produce an interferring result, this is true for the odd-levelled units during even cycles. It is seen that during these times, the steering units with mismatched time parity do not have valid contents. The preferred embodiment is not to activate steering units with mismatched time parity, except to receive results from active steering units.

In the interest of conciseness, the details in the clocking circuitry has been omitted in FIG. 3, excepting a gate connecting to the outside, labelled "time signal". The resetting of the apparatus registers into an invalid state is also briefly represented by an external connection labelled "reset".

Figure 4:
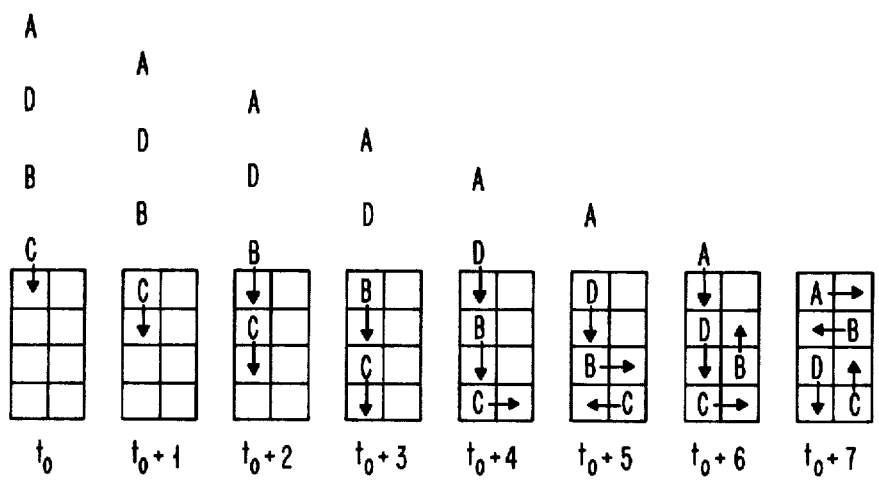
FIG. 4 depicts the sorting action of the invention.
Figure 4:
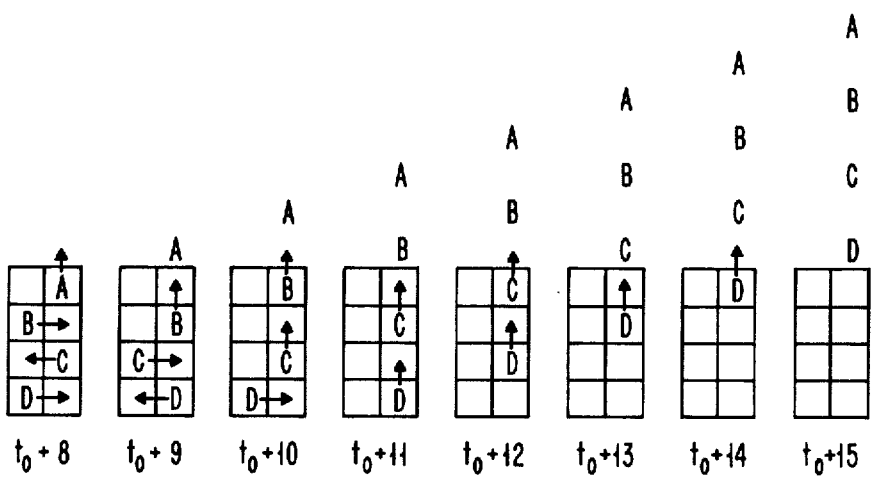

FIG. 4 depicts the dynamics in the use of the sorter FIG. 3 to sort four records C,B,D,A into A,B,C,D with (Identifier of A)<(Identifier of B)<(Identifier of C)<λ (Identifier of D). At time $t_o$, the records are outside the sorter, the contents in the registers are all reset to "invalid".

At time $t_o+1$ cycle First record (C) has entered register 43 of S1L, and steering units S1,S3 are activated. S3 contains only invalid or extraneous contents, and lead to no significant outcome. In S1, the case is a valid record (in S1L) versus an invalid record (in S1R), leading to a normal delivery signal of 0 in 53, resulting in the transfer of C from 43 to 63 and incidentally an invalid record from 59 to 40. We shall not describe invalid record movement unless they have impact on the valid results.

At time $t_o+2$ cycles, even numbered steering units are activated; these include S2, also T (alias S0R) and B (alias S4L). The comparison shows that only S2L has valid contents, which is transmitted normally from 63 to 83. During this transmission time interval, the second record (B) enters registers 43 of S1L.

As time $T_o+3$ cycles, S1,S3, are activated, with S1L,S3L, delivering valid contents from registers 43, 83 to 63, 103 respectively.

At time $t_o+4$ cycles S0R,S2,S4L are activated. The active full steering unit S2 will deliver B from register 63 to 83. The bottom unit S4L makes a mandatory crosspath transfer of C from register 103 to 99 in S3R. Meanwhile a third record (D) enters register 43 in S1L.

At $t_o+5$ cycles, with the activation of S1,S3, a true comparison between two valid records is made in S3, leading to a compare result 1, and subsequent crosspath transfer of B from 99 to 103 in S4L, C from 83 to 79 in S2R, S1 has only one valid record, and executes a normal vertical flow from 43 to 63 in S2L.

At $t_0+6$ cycles, activation of S0R, S2, S4L leads to true compare in S2 resulting in vertical flow, also mandatory crosspath from S4L.

At $t_o+7$ cycles, activation of S1,S3 both involve true comparisons. S1 leads to crosspath flow because A,B have been in the incorrect juxtaposition. S2 leads to normal vertical flow since C,D are correctly positioned. The last input record (A) enters S1L. The entered set of inputs are in the sorter.

At $t_o+8$ cycles S0R,S2,S4L are activated. S2 leads to crosspath flow. S4L executes mandatory crosspath flow, and SOR executes mandatory vertical flow, yielding A from register 40 trugh AND gate 42, path 41 to the outside, as global output.

At $t_o+9$ cycles S1, S3 are activated, S3 leading to crosspath flow. The contents of S1L is invalid, leading to normal vertical flow of S1R contents to S0R.

At $t_o+10$ cycles, S0R yields the second valid result(B).

At $t_o+11$ cycles S1L,S3L both have invalid contents leading to normal vertical flow. This normal flow persists through the rest of the sorting task. At $t_o+15$ cycles the last record (D) has emerged and the sorting task is complete.

The rebound sorter for N records can be assembled from (N−1) steering units, S1,S2, ... S(N−1), plus a bottom cell B (SNL) just below S(N−1)L, and a top cell T (S0R) just above S1R. All vertical input-output ports are aligned, to provide normal vertical flow down the left arm and up the right arm. All horizontal input-output ports are also aligned to provide crosspath flow. The vertical input to S(N−1)R is always 0, as is the horizontal input to S1L. FIGS. 2 and 3 furnish the description of the special case N=4.

To sort N records starting at time $t_o$, the first record enters S1L at the end of the zeroth cycle $[t_o,t_o+1)$. The jth record enters S1L at the end of the 2j-th cycle $[t_o+2j, t_o+2j+1)$. All odd steering units (S1,S3, ...) are active during odd cycles $[t_o+2k+1, t_o+2k+2)$, and all even steering units (S0,S2,S4, ...) are active during even cycles $[t_o+2k+2, t_o+2k+3)$. The top cell T is treated here as S0R, the right cell of an even steering unit. The bottom cell is treated here as SNL, the left cell of SN; the latter is odd or even dependent on whether N is odd or even.

The comparison rules for active steering unit SK are, for ascending order:

If (contents of L)≦(contents of R), or if either or both records are invalid, then issue compare result=0 to activate vertical output gates and deliver contents of SKL to S(k+1)L, and contents of SKR to S(k−1)R.

Else compare result=1, activating crosspath gates to deliver contents of SKL to S(k−1)R, contents of SKR to S(k+1)L.

(For descending order ≧ is replaced by ≦ above).

Then upon $t=t_o+(N+1)$ cycles the first true comparison begins.

$t=t_o+(2N-1)$ cycles the first output emerges out of S0R.

$t=t_o=(3N=3)$ cycles the last time comparison begins.

$t=t_o+(4N-1)$ cycles the last output emerges. Sorting is complete.

The sorting will be overlapped completely with loading ($t_o, t_o+2N$ cycles), and unloading ($t_o+2N+1, t_o+4N-1$).

As inferred before, the rebound sorter can be implemented in a variety of ways. As the input/output rate is one record per two cycles, and as comparisons occur twice as frequently, the embodiment is most efficient for those records which are inherently slow in motion relative to decisions. Certainly, source records from slow storage devices, also serially accessed records both have this property. For serial records, the access path widths can be reduced down to one bit wide for bit-serial records or one byte (6 to 8 bits) wide for byte-serial records for cost and space economy. Consequently, it will take more than one time interval to move a complete record. On the other hand, comparisons are made on record identifiers which usually occupy only a small portion of the record length and can be done rapidly by modern electronic means. Indeed, the identifiers can even be collected or copied, then compared by a separate, external fast device, as long as the records move in accordance with the corresponding comparison outcome.

It is apparent that embodiments can be fashioned in any one of a number of technologies; as for example, magnetic bubbles, charge couple devices, and semiconductor integrated circuit electronics or their proper admixture. Of importance is the fact that the rebound sorter requires only a single processing path and the logic to exchange and advance records at preselected points along the path. This is accomplished by folding over the path into a (U) shape and providing a sensing-/comparison and exchange mechanism between the contents at preselected points. As soon as more than N/2 records have entered the pipeline, then sorting action can take place. In co-pending application, 859 no comparison can occur until N−2 records have been loaded.

While in accordance with the provisions and statutes, there has been illustrated and described the best mode of the invention presently known, changes may be made in the system described without departing from the spirit of the invention as set forth in the appended claims. Some of these desirable changes are delineated below:

First, roughly half of the steering units are idle at any time, because during odd time cycles only odd-labelled steering units are needed, and during even time cycles only even-labelled steering units are needed. One economizing improvement is to share one comparator between two neighboring steering units, so that it serves odd-labelled units during odd cycles, and even-labelled units during even cycles. If the number N of records is odd, this sharing is perfect because the number of steering units is an even number. For an even N, one steering unit will be left over and need to contain its own comparison unit. Higher order of sharing of comparison units is possible as long as the overall comparison rate is maintained. It is also possible to do all comparisons outside the sorter, if the identifiers are copied or extracted, and are compared elsewhere. The compare result signals are fed into the simplified units.

Secondly, a small modification of the sorter is able to accommodate records up to twice the length of a steering unit register, provided that the identifier in each record is in the front portion of the record, and can be contained completely in one register. The "tail" segment of the record then occupies an adjacent cell, and always follows the movement of the front segment, lagging behind by exactly one cycle.

Also, apparatus of the invention may be modified in order to facilitate the comparison of records longer than one register in length. This adjustment in the gating and buffering is one such that the comparison result signal in every active steering unit will control for two successive cycles the output of the registers in both cells during the later phase of the active cycle and the next cycle at which time the comparison mechanisms are disabled. This adjustment will allow the second part of a long record to follow the flow of the first part which contains the identifier and the proper validity indicators, without interfering with any delivery of the active steering units. This feature will enable long records to enter the apparatus in two segments, the second segment following the leading segment exactly by one time cycle throughout the sorting run. The input/output rate for this double precision flow remains the same as before, namely at one record per two time cycles.

Thirdly, a rebound sorter may have 2N cells, capable of sorting N records. It should also be able to sort a smaller number (say M) of records. This is done easily by enforcing a compulsory crosspath flow from the left cell of S(M+1), this left cell in effect is degenerated into a bottom cell. Many techniques can be invoked to do this. The preferred embodiment is to bias the critical comparator to generate only 1 signals during this smaller sorting task. Another way is to use fictitious data to achieve this comparison result signal.

Fourthly the top buffer cell (T or S0R in FIG. 3) is just a convenient place to provide a global exit. It can be replaced by DOT-ORing the two source paths $h_R^{in}$ and $v_R^{in}$ into the output path. The results will emerge one cycle earlier by this simplification.

We claim:

1. An apparatus for sorting N plural bit records, each record having an identifier, the apparatus comprises
a uniformly flowing path;
an input and output terminal adapted respectively to accept records one after the other into the path and to discharge records one after the other from the path;

means at predetermined times and at predetermined path points for sensing record identifiers and validity indicators, and for comparing selective sensed identifiers in pairs; and means for synchronously advancing those pairs of records along the path from input to output terminals by one position, if the comparison of sensed identifiers shows the records to be in the correct juxtaposition, and for synchronously first exchanging the path position of the records of each pair whose compared sensed identifiers show that said records are not correctly juxtaposed and then advancing the exchanged records along the path from input to output terminals by one position.

2. An apparatus according to Claim 1, wherein:

the uniform flowing path includes a first (43), second (59), third (63) and fourth (40) register, and a first (5) and second (33) path, said first and second registers adapted to respectively store a first and second record, the advancing and exchanging means includes a gating path selection mechanism (45, 47, 49, 55, 57, 61) and a third (37) and a fourth (29) path, the means for sensing and comparing identifiers includes circuitry (51, 53) responsive to the record identifiers contained in the first and second registers for providing selective indication of relative magnitude of a first and second kind, said path selection mechanism being responsive to a relative magnitude indication of the first kind for connecting the first and third registers over the first path and the second and fourth registers over the second path, said mechanism being also responsive to an indication of the second kind for connecting the first and fourth registers over the third path and the second and third registers over the fourth path.

3. An apparatus according to claim 2, wherein to sort N records the uniformly flowing path comprises:

2N registers, 2N−2 of the registers being clustered as N−1 pairs;

the sensing and comparing means include:

N−1 comparison circuits, each circuit coupling a corresponding one of the register pairs.

4. An apparatus according to claim 3, where:

the 2N registers are intercoupled to form a folded-over U shaped linear flow path upon each of the comparison circuits generating a signal of the first kind, there being N registers in the descending path of the U Shape, N registers in the ascending path of the U shape, including one register operatively coupling the descending and ascending paths as a transfer buffer, and one other register coupling the ascending path to an output port.

5. An apparatus according to claim 1, wherein said apparatus is partitioned into a plurality of modules; each module being intermediate a first and second neighboring module, each module comprising a first and second register adapted to store records; means for comparing the identifiers and validity indicators of the records stored in the registers and for generating signals indicative of comparability and incomparability; and a logic arrangement responsive to comparability signals for selectively connecting the first and second registers to the respective registers of the first and second neighboring modules or vis a vis and for transferring the register contents, said logic arrangement being also responsive to the incomparability signals for only coupling the first register to the register in the first module and the second register to the register in the second module.

6. An apparatus for sorting N plural bit records, each record having an identifier, the apparatus comprising:

an input and output terminal for serially accepting records into and discharging records from the apparatus;

2N registers, each register being adapted to store one record, 2N−2 of the registers being clustered as N−1 pairs;

N−1 comparison circuits, each circuit coupling a corresponding one of the register pairs for providing signals indicative of the relative magnitude difference of a first or second kind between the identifiers of the records contained in the register pair; and means for interconnecting registers to form a linked linear array of the 2N registers, said means coupling the input terminal at one end of the linear array and the output terminal at the other end of the linear array, said means also including means for synchronously advancing by one register position along the array from the input to output terminals the record contents of those register pairs whose corresponding comparison circuits generate signals of the first kind, said means further including means for synchronously exchanging the record contents between the registers of each pair whose corresponding comparison circuit generates signals of the second kind, said exchanged records then being advanced by one register position along the linear array from the input to output terminals.

7. An apparatus according to claim 6, wherein said apparatus being cyclically operable in uniformly spaced time intervals, said apparatus further being serially loaded with a first one of N records to be sorted at time $T_O$, said apparatus executing its first comparison of record identifiers in $T_O + N + 1$ intervals, discharging its first sorted record from the apparatus in $T_O + 2N + 1$ intervals, executing its last comparison among the records to be sorted in $T_O + 3N - 3$ intervals, and discharging the last sorted record in $T_O + 4N - 1$ intervals.

8. An apparatus according to claim 7, wherein the comparison signals from the comparison circuits operate upon the interconnecting means and their counterpart registers for two successive cycles in order to facilitate the comparison exchanging and advancing of the records longer than one register in length.

9. An apparatus according to claim 8 wherein each of the plural bit records are of equal fixed length.

* * * * *